United States Patent [19]

Yokoyama

[11] 3,721,683

[45] March 20, 1973

[54] PROCESS FOR THE PREPARATION OF AROMATIC CARBOXYLIC ANHYDRIDES

[75] Inventor: Ryoichi Yokoyama, Hiroshima-ken, Japan

[73] Assignee: Teijin Chemicals Limited, Tokyo, Japan

[22] Filed: June 13, 1969

[21] Appl. No.: 833,191

[52] U.S. Cl. ................260/346.4, 252/469, 252/443
[51] Int. Cl. .............................................C07c 63/18
[58] Field of Search......................................260/346.4

[56] References Cited

UNITED STATES PATENTS

| 2,954,385 | 9/1960 | Burney et al. | 260/346.4 |
| 3,300,516 | 1/1967 | Urbaski | 260/346.4 |
| 3,509,179 | 4/1970 | Friedrichsen et al. | 260/346.4 |

FOREIGN PATENTS OR APPLICATIONS

| 1,166,763 | 4/1964 | Germany | 260/346.4 |

*Primary Examiner*—Alex Mazel
*Assistant Examiner*—Bernard Dentz
*Attorney*—Sherman and Shalloway

[57] ABSTRACT

A process for the preparation of an aromatic carboxylic anhydride comprising reacting o-xylene or durene with molecular oxygen in the vapor phase, in the presence of a solid oxidation catalyst, which is characterized in that the solid oxidation catalyst in that obtained by calcining, at temperatures not lower than 560°C., a mixture of a vanadium compound, a chromium compound and a promotor metal component selected from the group consisting of tin plus antimony, germanium, tin plus indium, niobium, tantalum, gallium and zirconium, the atomic ratio of vanadium to chromium in the catalyst being within the range of 1: 0.5~1 : 1.

10 Claims, No Drawings

PROCESS FOR THE PREPARATION OF AROMATIC CARBOXYLIC ANHYDRIDES

This invention relates to a process for the preparation of aromatic carboxylic anhydrides, particularly phthalic and pyromellitic anhydrides. More particularly, the invention relates to the preparation of aromatic carboxylic anhydrides by the vapor-phase oxidation of o-xylene or durene in the presence of a novel solid oxidation catalyst.

Phthalic anhydride and pyromellitic anhydride are valuable starting materials of various resins. Known methods of preparing those aromatic carboxylic anhydrides include liquid-phase oxidation of o-xylene or durene with nitric acid, and vapor-phase oxidation of the named hydrocarbons in the presence of a solid oxidation catalyst.

However, since the involved reaction is exothermic, heretofore known solid catalysts for the vapor-phase oxidation of o-xylene or durene exhibit insufficient heat resistance under the high temperatures at reaction zone, and furthermore the yield of the resulting aromatic carboxylic anhydride has not been satisfactory.

For the purpose of resolving those problems, it is proposed, for example, by Japanese Official Patent Gazette, Publication No. 5862/1969, to produce phthalic anhydride by the vapor-phase oxidation of o-xylene in the presence of a catalyst obtained by calcining ammonium metavanadate and ammonium chromate at temperatures of 650°C. and above. The catalyst which is obtained exhibits satisfactory heat resistance, but the phthalic anhydride yield in the reaction is still unsatisfactory.

Also German Pat. No. 1,166,763 proposed the vapor-phase oxidation of o-xylene to be performed in a fluidized bed of the catalyst obtained by calcining ammonium metavanadate and ammonium dichromate in the presence of an organic binder, with optional addition of an oxide of K, Ag, Ce, Cu, Fe, Mn, Ni or Co, phosphoric acid, $P_2O_5$, phosphate, oxide of molybdenum or tungsten, phosphomolybdenic acid, molybdate or tungstate, as the promotor. The catalyst shows sufficient heat resistance when o-xylene is used at relatively low concentrations in the above-described method, but is unsatisfactory as to heat resistance and phthalic anhydride yield when repetitively used for oxidation of o-xylene at high concentrations.

It is a well-known and established fact in the industrial preparation of phthalic anhydride from o-xylene, that the vapor-phase oxidation is more advantageous than the liquid-phase oxidation, and that in the vapor-phase oxidation, greater o-xylene supply per unit amount of the catalyst, i.e., higher o-xylene concentration in the vapor phase, is preferred for improving the productivity per unit amount of the catalyst.

Also in the vapor-phase oxidation of durene, the theoretical amount of heat generation during the reaction reaches as much as 1.5 times that in the vapor-phase oxidation of o-xylene. Consequently, the heat elimination from the reaction zone is more difficult, and the temperature at the hot spot of the reaction zone is higher. Furthermore, because all the four methyl groups bound to the aromatic ring must be converted to carboxyl groups in the oxidation of durene, the yield of the desired carboxylic anhydride is still lower than that in the o-xylene oxidation.

The object of the present invention is to provide novel solid oxidation catalysts which exhibit excellent heat resistance and high catalytic activity in the preparation of aromatic carboxylic anhydrides by vapor-phase oxidation of o-xylene or durene.

Another object of the invention is to provide a process for the preparation of aromatic carboxylic anhydrides, whereby the desired products can be prepared at high yields and high productivity by the vapor-phase oxidation of o-xylene or durene, without any trouble such as reduction in catalytic activity even when o-xylene or durene is used at relatively high concentrations.

According to the invention, a process for the preparation of an aromatic carboxylic anhydride comprising reacting ortho-xylene or durene with molecular oxygen at vapor phase in the presence of a solid oxidation catalyst is provided, which is characterized in that the solid oxidation catalyst is prepared by calcining, at temperatures not lower than 560°C., a mixture consisting of a. a vanadium oxide or a vanadium compound which is convertible to vanadium oxide at the calcining temperature, b. a chromium oxide or a chromium compound which is convertible to chromium oxide at the calcining temperature, and c. at least one oxide of a promotor metal component selected from the group consisting of tin plus antimony, germanium, tin plus indium, niobium, tantalum, gallium and zirconium, or at least one compound of the promotor metal component which is convertible to the corresponding oxide at the calcining temperature, the atomic ratio of vanadium to chromium in the catalyst ranging from 1 : 0.5 – 1 : 1.

As mentioned above, the catalyst of the invention is prepared by calcining a mixture of:

a. a vanadium oxide or a vanadium compound which is convertible to vanadium oxide at the calcining temperature, b. a chromium oxide or a chromium compound which is convertible to chromium oxide at the calcining temperature, and c. at least one oxide of the named promotor metal component or at least one compound of such metal which is convertible to the oxide at the calcining temperature, at the temperature of at lowest 560°C.

The valence of vanadium component in the catalyst is variable, although the pentavalent state is preferred for the subject process.

The source of vanadium component may be a vanadium oxide such as $V_2O_5$, but preferably it is a vanadium compound such as ammonium metavanadate, vanadyl sulfate, vanadium hydroxide, and vanadyl carboxylates such as formate and oxalate, which can become vanadium oxide at the calcining temperature. The vanadium compound most convenient for the catalyst preparation is ammonium metavanadate.

It is preferred that the chromium component in the catalyst should be a trivalent chromium oxide or a compound which can provide trivalent chromium oxide during the calcination. Hexavalent chromium oxide or a chromium compound which provides hexavalent chromium oxide such as $CrO_3$ at the calcination tends to lower the yield of desired aromatic carboxylic anhydride compared with the case of using trivalent chromium oxide. Preferred sources of the chromium component include ammonium (III) chromate, chromium (III) nitrate, chromium (III) sulfate, chromium (III) hydroxide, chromium (III) ammonium alum, etc., which can become $Cr_2O_3$ at the calcining temperature. Among the above-named, particularly the water-soluble compounds are preferred.

It is important that the ratio of vanadium component to chromium component in the catalyst should be such that the atomic ratio of vanadium to chromium lies within the range of 1 : 0.5 – 1 : 1. When the chromium component is present in a less amount, the catalyst becomes glassy, and consequently the reaction rate is reduced, conversion of the starting aromatic compound is lowered, and formation of side products such as quinones and maleic acid, etc. increases. In such a case, the results are quite unsatisfactory as to the yield and purity of the desired acid anhydride, and heat resistance of the catalyst.

When the chromium component is used in an amount greater than the above-specified range, the catalyst coherence is impaired, and furthermore the conversion of the starting aromatic compound to $CO_2$ increases to reduce the yield of acid anhydride.

The optimum range of the atomic ratio of V : Cr in the catalyst of this invention is 1 : 0.6 – 1 : 0.75.

An important characteristics of the invention resides in the addition of a specific metal component to the catalyst as a promotor, besides the above vanadium and chromium components. The metal component is selected from the group consisting of tin plus antimony, germanium, tin plus indium, niobium, tantalum, gallium and zirconium. Such metal component serving as a promotor is added to the vanadium and chromium components as at least one oxide, or compound which is convertible to the oxide of such metal at the calcining temperature. As the compounds other than the oxide, the nitrate, halogenide, ammonium salt, hydroxide, and organic acid salts such as formate and oxalate can be used. Such metal component serving as the promotor is preferably water-soluble. Particularly advantageous promotor metal components in accordance with the invention are tin plus antimony, germanium, and tin plus indium, by the order stated. The combination of tin plus antimony contributes to the preparation of the desired aromatic carboxylic anhydride at high purity and high yield. Also germanium exhibits the conspicuous effect of improving the yield of the aromatic carboxylic anhydride. When the combination of tin plus antimony is used, their use at the atomic ratio of Sn : Sb of 1 : 0.1 – 1 : 0.6 is particularly effective. When the tin plus indium combination is employed, the preferred Sn : In atomic ratio is within the range of 1 : 0.1 – 1 : 06. Obviously, the promotor metal components can be used individually or in combination.

Normally a suitable amount of the promotor metal component in the catalyst ranges, in terms of percentages in atomic ratio, is 0.5 – 20 percent, particularly 1 – 15 percent, based on the total vanadium and chromium metal components. When the promotor metal component is less than the lower limit specified above, appreciable improvement of the acid anhydride yield cannot be expected. If it is more than the upper limit, heat resistance of the catalyst is impaired. The promotor metal component employed in the invention exhibits a unique effect that in it improves the yield of desired aromatic carboxylic anhydride, while substantially maintaining the excellent heat resistance of the known $V_2O_5-Cr_2O_3$ catalyst system. For example, the addition of lithium phosphate, potassium sulfate, etc. to $V_2O_5-Cr_2O_3$ catalyst system is effective for improving the aromatic carboxylic anhydride yield at relatively low temperatures, but heat resistance and durability of the catalyst are markedly impaired. Also addition of metal oxides other than those specified in the invention, such as lead oxide, molybdenum oxide, uranium oxide, potassium metaborate, thallium oxide, zinc oxide, silver oxide, copper oxide, iron oxide, nickel oxide, cerium oxide, cobalt oxide, etc. to the $V_2O_5-Cr_2O_3$ catalyst system shows substantially no yield-improving effect or, on the contrary, in certain cases lowers the acid anhydride yield.

According to the invention, the mixture comprising the vanadium component, chromium component and promotor metal component, is calcined at temperatures not lower than 560°C., preferably at 560° – 850°C. Simple mixture of the above three components fails to show the activity exhibited by the catalyst of the invention. In view of the fact that $V_2O_5$ and $Cr_2O_3$ react at 560°C. or above to from $CrVO_4$, presumably at least a part of the $V_2O_5$ in the catalyst of the invention is present as $CrVO_4$. Furthermore, in the invention it is preferred to add the promotor metal component to the vanadium and chromium components, prior to the calcination. Little yield-improving effect is obtained if the promotor component is added after calcination of the other two components. It is evident that the catalyst of the invention is different from simple mixtures of calcined products of vanadium and chromium components with the promotor metal component, because the two types of catalysts are quite different in color.

The catalyst of the invention can be used when shaped into granules of optional size without using any carrier, but normally it is bound onto a refractory material which is conventionally used as the carrier of oxidation catalysts. As such carrier, refractories having a specific surface area of 2 $m^2$/g or less are suitably used. For example, fused silica, fused alumina, silicon carbide, pumice, porcelain, silicate, and the like are advantageously used.

The catalyst can be carried on such carriers by conventional means. For example, as the vanadium, chromium, and promotor metal components, the compounds which are soluble in water or dilute acid are selected, and the components are dissolved in water or a dilute acid at the ratios within the above-specified ranges. Then by impregnating the suitable carrier with the resulting solution and calcining the same at 560°C. or above, the catalyst bound onto the carrier is obtained. In accordance with a preferred embodiment of the invention, silica sol is added to the aqueous or dilute acid solution of the catalyst components. Such addition of silica sol during the formation of the solution assists adhesion of the catalyst components to the carrier, and further improves the activity and heat resistance of the catalyst. It is particularly advantageous to add silica sol in an amount of 5 – 50 wt. % based on the total catalyst components calculated as oxides.

The catalyst of the invention can be prepared in an optional grain size. Suitable grain size differs somewhat depending on the manner of oxidation reaction which may be performed with fluidized bed or fixed bed, but generally the suitable size can be selected from the range of 0.05 – 10 mm.

The catalyst of the invention is useful in the vapor-phase oxidation of o-xylene to form phthalic anhydride and in the vapor-phase oxidation of durene to form pyromellitic anhydride. In the latter reaction the catalyst is particularly valuable, because the reaction is more exothermic than the former and achieves less yield of the desired product.

The vapor-phase oxidation of o-xylene or durene can be easily performed by contacting the vapor of the aromatic compound, together with molecular oxygen, with the above-described catalyst at the temperatures within the range of 320° – 850°C., preferably 320° – 650°C. Because the catalyst of the invention possesses excellent heat resistance, high catalytic activity level can be maintained under high temperature in the reaction zone, even when the starting aromatic compound is supplied at considerably high concentrations. Thus in accordance with the present invention, the vapor-phase oxidation can be smoothly carried out at relatively high concentrations of the aromatic compound, such as 10 – 60 g/Nm$^3$, preferably 20 – 50 g/Nm$^3$ per gaseous substances supplied to the reaction system, for durene; and 40 – 130 g/Nm$^3$, preferably 60 – 120 g/Nm$^3$ for o-xylene.

The molecular oxygen is preferably diluted in an inert gas such as $N_2$, $CO_2$, and the like, in order to maintain the reaction system at low temperatures. As such oxygen-containing gas, air is the most economical. The molecular oxygen supply to the starting aromatic compound should be at least twice, preferably 3 – 40 times, the theoretical amount. The contact time of the starting aromatic compound with the catalyst is somewhat variable according to reaction temperature, but normally a contact time of 0.05 – 20 seconds is sufficient. The reaction pressure is not critical, and may be slightly reduced or elevated such as 2 kg/cm$^2$ Gauge, but normally atmospheric pressure is quite satisfactory.

The reaction can be effected in known vapor-solid catalytic reaction apparatus in which the catalyst is used as a fixed, moving, or fluidized layer. Even when a fixed-bed type reactor in which hot spots are apt to be formed is used, the catalyst of the invention exhibits little reduction in catalytic activity, due to its excellent heat resistance. This is one of the conspicuous advantages of the invention.

The aromatic carboxylic anhydride produced by the subject process can be recovered by means known per se. For example, the gaseous product discharged from the reactor can be cooled with an optional cooling medium to separate and recover the aromatic carboxylic anhydride as a liquid or solid. Alternatively the gaseous product may be contacted with an optional liquid extraction medium to allow recovery of the desired product in the form of a solution. According to the invention, the aromatic carboxylic anhydride is contained in the gaseous reaction product at high concentrations. Consequently, the above recovery procedures are easier compared with known recovery methods.

Thus in accordance with the present invention, phthalic anhydride of very high purity can be industrially prepared from o-xylene at the yields as high as 90 – 110 wt. % (approximately 63 – 75 mol percent). Furthermore, the phthalic anhydride can be formed at characteristically high concentrations and with high production efficiency. Also according to the invention, very high purity pyromellitic anhydride can be prepared from durene on an industrial scale, at such high yields as 100 – 140 wt. % (approximately 62 – 87 mol percent).

The catalyst employed in the subject process exhibits excellent heat resistance, and consequently shows a wide range of allowance to industrially practiced reaction conditions, as well as stable and prolonged catalytic activity.

Hereinafter the invention will be explained with reference to the working examples.

Example 1

A. Preparation of catalyst

Fused alumina having a specific surface area of 1.1 m$^2$/g was crushed, and sieved to be given an average grain diameters of 2.4 – 3.4 mm, to be used as the carrier.

25 g of ammonium metavanadate and 25 g of ammonium chromate (per 1 gram atom of V, ¾ gram atom of Cr) were dissolved in 1 liter of water. Separately, 0.8 g of antimony oxide ($Sb_2O_3$) (1.5 percent as percentile atomic ratio to V + Cr) and 4 g of stannic chloride ($SnCl_4 \cdot 5H_2O$, 6.6 percent as percentile atomic ratio to V + Cr) were dissolved in minor amount of hydrochloric acid, and the solution was added to the first solution with thorough agitation, to form a suspension. Pouring the suspension onto 100 ml of the fused alumina carrier, the resulting impregnation product was pre-calcined at 400° – 450°C., followed by two hours' calcination at 560° – 750°C. Thus a catalyst was prepared.

B. Synthesis of pyromellitic anhydride 40 ml of the above catalyst were packed in a U-shaped heat resisting glass tube of 20 mm in diameter, and the tube was immersed in a salt bath composed of a mixture of nitrate and nitrite. Durene was fused by heating, and pre-heated air was blown thereinto to form a durene-containing gas at a concentration of 30 g/Nm$^3$. The gas was then fed onto the catalyst bed under the conditions of 3,200 l/hr. and the salt bath temperature of 360°C. During the reaction, the catalyst bed temperature reached at the highest 590°C. The gas leaving the catalyst layer was discharged into air through an air-cooling condenser and rinsing collector. From the air-cooling condenser, pyromellitic anhydride of 98.7 percent purity was recovered at the yield of 118 wt. %.

Example 2

A. Preparation of catalyst

Crushed silicon carbide having a specific surface area of 1.0 m$^2$/g was sieved to provide a carrier of the grain size averaging 3.4 – 4.8 mm in diameter.

500 g of ammonium metavanadate and 400 g of ammonium chromate (V : Cr = 1 : 0.6) were dissolved in 10 liters of hot water. Separately, 15 g of germanium oxide (2.1 percent as percentile atomic ratio to V + Cr) were dissolved in a minor amount of dilute aqueous ammonia, and added to the first hot aqueous solution. Further, 400 g of 30 percent concentration silica sol solution (19.4 wt. % to the total of $V_2O_5$, $Cr_2O_3$, and $GeO_2$) were added to the system to form a yellowish orange, transparent aqueous solution. Then the solution was gradually poured onto 2 liters of the carrier prepared in advance, to cause adhesion of effective ingredients to the carrier. The carrier was subsequently pre-calcined at 400° – 420°C., and calcined at 560° – 750°C. to provide a yellowish brown catalyst.

B. Synthesis of pyromellitic anhydride 400 ml of the catalyst were packed in a 1-inch diameter steel pipe to a height of 70 cm. A 4-inch diameter pipe was concentrically placed to enclose the first pipe, and the space therebetween was filled with a salt bath composed of a mixture of potassium nitrate, sodium nitrate and sodium nitrite, and electrically heated. The heating can be switched in three stages, with each voltage being variable. Thus the temperature in the reaction system was automatically controllable. The reaction product was caught by four collectors each 6 inches in diameter and 60 cm in length. The equipment was further attached with a rinsing tower and an alkali-washing tower. The evaporation of durene was effected through a Raschig ring-packed tower, as fused durene was dropped thereinto by means of a quantitative pump to be counter-currently contacted with heated air. Preceding the quantitative pump, a durene-fusing tank was located which was electrically heated and placed on a balance so that its weight decrease could be immediately determined.

The durene-containing air leaving the evaporator was led onto the catalyst and oxidized. After 100 hours' reaction at the durene concentration of 30 g/Nm³, space velocity of 12,000 l/hr, and salt bath temperature of 440°C., pyromellitic anhydride of 98 percent purity was obtained at a yield of 125 wt. %. The temperature of the catalyst layer reached 750°C. at the hot spot.

Example 3

Catalysts were prepared in the manner described in Example 1-A, except that the third promotor metal component was replaced by the metal component specified for each run in Table 1 below. Using those catalysts, durene was oxidized at vapor phase in the manner described in Example 1-B, except that the salt bath temperatures specified in Table 1 were employed. The results were also given in the same Table, in which * sign denotes that the specific run was conducted as a control.

TABLE I

| Run No. | Promotor Metal Components | Amount (atomic ratio in % to V + Cr) | Salt Bath Temp. in vapor-phase (°C.) | Product Pyromellitic Anhydride Yield (wt.%) | Purity (%) |
| --- | --- | --- | --- | --- | --- |
| 1 | — | — | 420 – 440 | 98.2 | 97.8 |
| 2 | { $Sb_2O_3$ / $SnCl_4 \cdot 3.5H_2O$ } | { 1 / 4 } | 390 – 420 | 121.2 | 98.5 |
| 3 | { $Sb_2O_3$ / $SnCl_4 \cdot 3.5H_2O$ } | { 1 / 4 } | 375 – 400 | 130.0 | 98.7 |
| 4 | $GeO_2$ | 2.7 | 410 – 430 | 135.6 | 98.0 |
| 5 | { $InCl_3$ / $SnCl_4 \cdot 3.5H_2O$ } | { 1 / 4 } | 390 – 420 | 126.1 | 98.5 |
| 6 | $NbCl_5$ | 1 | 370 – 410 | 105.0 | 98.3 |
| 7 | $TaCl_5$ | 1 | 370 – 410 | 103.3 | 98.3 |
| 8 | $Ga_2O_3$ | 2.5 | 410 – 430 | 102.5 | 98.0 |
| 9 | $ZrCl_4$ | 10.0 | 350 – 410 | 108.9 | 99.0 |
| 10* | NiO | 5.0 | 450 – 460 | 80.8 | 95.0 |
| 11* | $Ce_2O_3$ | 2.6 | 440 – 450 | 82.2 | 94.5 |
| 12* | $Ag_2O$ | 2.0 | 440 – 450 | 68.8 | 95.0 |

The results given in above Table 1 persuasively demonstrate that the promotor metal component within the scope of this invention is effective for improving the yield and purity of pyromellitic anhydride.

Example 4

A chromium sulfate solution containing 10.0 g of chromium component as $Cr_2O_3$ was added to a vanadyl sulfate solution containing 15.5 g of vanadium component as $V_2O_5$, and the resulting solution was further mixed with 2 g of stannic sulfate ($Sn(SO_4)_2 \cdot 2H_2O$) and 0.4 g of antimony trichloride. The V : Cr : Sn : Sb ratios in the solution as atomic ratios were approximately 1 : ¾ : 0.04 : 0.01 . The solution was poured onto 100 ml of crushed fused alumina (pure white) of a 2.4–3.4 mm diameter (6–8 mesh) grain size little by little, under heating. Upon completion of the pouring, the effective ingredients-bound alumina was precalcined at 400° – 450°C. to completely decompose and volatilize $SO_2$. The catalyst system was then calcined for 1.5 hours in an electric oven of 780°C., while passing sufficient air therethrough. 40 ml of the catalyst were packed in a Pyrex glass tube of 18 mm in inner diameter, and air was passed therethrough to be reacted with o-xylene which was fed at the concentration of 60 g/Nm³ and space velocity of 5,000 l/hr. The salt bath temperature was 400°C. Thus pure white crude phthalic anhydride (99.3 % purity) was produced at a yield of 94.6 wt. %. The maleic anhydride yield in the run was 3.6 wt.%.

Example 5

250 Grams of ammonium metavandate and 180 g of ammonium chromate were dissolved in approximately 6 liters of hot water, and to the solution 250 g of 30 percent concentration silica sol solution (tradename: Snowtex 30), 50 g of stannic chloride ($SnCl_4 \cdot 3.5H_2O$) and 10 g of antimony pentachloride were added with thorough stirring. The resulting suspension was poured onto 1 liter of silicon carbide carrier (tradename: Carbonrundum, 3 – 5 mesh in grain size), and together precalcined at 400° – 450°C. V : Cr : Sn : Sb in the system as atomic ratios were approximately 1 : 0.55 : 0.064 : 0.015. The pre-calcined catalyst was further calcined for 2 hours in an electric oven of 750°C., under sufficient air supply.

to add silica sol in an amount of 5 - 50 wt. % based on the total catalyst components calculated as oxides.

The catalyst of the invention can be prepared in an optional grain size. Suitable grain size differs somewhat depending on the manner of oxidation reaction which may be performed with fluidized bed or fixed bed, but generally the suitable size can be selected from the range of 0.05 - 10 mm.

The catalyst of the invention is useful in the vapor-phase oxidation of o-xylene to form phthalic anhydride and in the vapor-phase oxidation of durene to form pyromellitic anhydride. In the latter reaction the catalyst is particularly valuable, because the reaction is more exothermic than the former and achieves less yield of the desired product.

The vapor-phase oxidation of o-xylene or durene can be easily performed by contacting the vapor of the aromatic compound, together with molecular oxygen, with the above-described catalyst at the temperatures within the range of 320° - 850°C., preferably 320° - 650°C. Because the catalyst of the invention possesses excellent heat resistance, high catalytic activity level can be maintained under high temperature in the reaction zone, even when the starting aromatic compound is supplied at considerably high concentrations. Thus in accordance with the present invention, the vapor-phase oxidation can be smoothly carried out at relatively high concentrations of the aromatic compound, such as 10 - 60 g/Nm$^3$, preferably 20 - 50 g/Nm$^3$, per gaseous substances supplied to the reaction system, for durene; and 40 - 130 g/Nm$^3$, preferably 60 - 120 g/Nm$^3$, for o-xylene.

The molecular oxygen is preferably diluted in an inert gas such as $N_2$, $CO_2$, and the like, in order to maintain the reaction system at low temperatures. As such oxygen-containing gas, air is the most economical. The molecular oxygen supply to the starting aromatic compound should be at least twice, preferably 3 - 40 times, the theoretical amount. The contact time of the starting aromatic compound with the catalyst is somewhat variable according to reaction temperature, but normally a contact time of 0.05 - 20 seconds is sufficient. The reaction pressure is not critical, and may be slightly reduced or elevated such as 2 kg/cm$^2$ Gauge, but normally atmospheric pressure is quite satisfactory.

The reaction can be effected in known vapor-solid catalytic reaction apparatus in which the catalyst is used as a fixed, moving, or fluidized layer. Even when a fixed-bed type reactor in which hot spots are apt to be formed is used, the catalyst of the invention exhibits little reduction in catalytic activity, due to its excellent heat resistance. This is one of the conspicuous advantages of the invention.

The aromatic carboxylic anhydride produced by the subject process can be recovered by means known per se. For example, the gaseous product discharged from the reactor can be cooled with an optional cooling medium to separate and recover the aromatic carboxylic anhydride as a liquid or solid. Alternatively the gaseous product may be contacted with an optional liquid extraction medium to allow recovery of the desired product in the form of a solution. According to the invention, the aromatic carboxylic anhydride is contained in the gaseous reaction product at high concentrations. Consequently, the above recovery procedures are easier compared with known recovery methods.

Thus in accordance with the present invention, phthalic anhydride of very high purity can be industrially prepared from o-xylene at the yields as high as 90 - 110 wt. % (approximately 63 - 75 mol percent). Furthermore, the phthalic anhydride can be formed at characteristically high concentrations and with high production efficiency. Also according to the invention, very high purity pyromellitic anhydride can be prepared from durene on an industrial scale, at such high yields as 100 - 140 wt. % (approximately 62 - 87 mol percent).

The catalyst employed in the subject process exhibits excellent heat resistance, and consequently shows a wide range of allowance to industrially practiced reaction conditions, as well as stable and prolonged catalytic activity.

Hereinafter the invention will be explained with reference to the working examples.

Example 1

A. Preparation of catalyst

Fused alumina having a specific surface area of 1.1 m$^2$/g was crushed, and sieved to be given an average grain diameters of 2.4 - 3.4 mm, to be used as the carrier.

25 g of ammonium metavanadate and 25 g of ammonium chromate (per 1 gram atom of V, ¾ gram atom of Cr) were dissolved in 1 liter of water. Separately, 0.8 g of antimony oxide ($Sb_2O_3$) (1.5 percent as percentile atomic ratio to V + Cr) and 4 g of stannic chloride ($SnCl_4 \cdot 5H_2O$, 6.6 percent as percentile atomic ratio to V + Cr) were dissolved in minor amount of hydrochloric acid, and the solution was added to the first solution with thorough agitation, to form a suspension. Pouring the suspension onto 100 ml of the fused alumina carrier, the resulting impregnation product was pre-calcined at 400° - 450°C., followed by two hours' calcination at 560° - 750°C. Thus a catalyst was prepared.

B. Synthesis of pyromellitic anhydride 40 ml of the above catalyst were packed in a U-shaped heat resisting glass tube of 20 mm in diameter, and the tube was immersed in a salt bath composed of a mixture of nitrate and nitrite. Durene was fused by heating, and pre-heated air was blown thereinto to form a durene-containing gas at a concentration of 30 g/Nm$^3$. The gas was then fed onto the catalyst bed under the conditions of 3,200 l/hr. and the salt bath temperature of 360°C. During the reaction, the catalyst bed temperature reached at the highest 590°C. The gas leaving the catalyst layer was discharged into air through an air-cooling condenser and rinsing collector. From the air-cooling condenser, pyromellitic anhydride of 98.7 percent purity was recovered at the yield of 118 wt. %.

Example 2

A. Preparation of catalyst

Crushed silicon carbide having a specific surface area of 1.0 m$^2$/g was sieved to provide a carrier of the grain size averaging 3.4 - 4.8 mm in diameter.

500 g of ammonium metavanadate and 400 g of ammonium chromate (V : Cr = 1 : 0.6) were dissolved in 10 liters of hot water. Separately, 15 g of germanium oxide (2.1 percent as percentile atomic ratio to V + Cr) were dissolved in a minor amount of dilute aqueous ammonia, and added to the first hot aqueous solution. Further, 400 g of 30 percent concentration silica sol solution (19.4 wt. % to the total of $V_2O_5$, $Cr_2O_3$, and $GeO_2$) were added to the system to form a yellowish orange, transparent aqueous solution. Then the solution was gradually poured onto 2 liters of the carrier prepared in advance, to cause adhesion of effective ingredients to the carrier. The carrier was subsequently pre-calcined at 400° – 420°C., and calcined at 560° – 750°C. to provide a yellowish brown catalyst.

B. Synthesis of pyromellitic anhydride 400 ml of the catalyst were packed in a 1-inch diameter steel pipe to a height of 70 cm. A 4-inch diameter pipe was concentrically placed to enclose the first pipe, and the space therebetween was filled with a salt bath composed of a mixture of potassium nitrate, sodium nitrate and sodium nitrite, and electrically heated. The heating can be switched in three stages, with each voltage being variable. Thus the temperature in the reaction system was automatically controllable. The reaction product was caught by four collectors each 6 inches in diameter and 60 cm in length. The equipment was further attached with a rinsing tower and an alkali-washing tower. The evaporation of durene was effected through a Raschig ring-packed tower, as fused durene was dropped thereinto by means of a quantitative pump to be counter-currently contacted with heated air. Preceding the quantitative pump, a durene-fusing tank was located which was electrically heated and placed on a balance so that its weight decrease could be immediately determined.

The durene-containing air leaving the evaporator was led onto the catalyst and oxidized. After 100 hours' reaction at the durene concentration of 30 g/Nm$^3$, space velocity of 12,000 l/hr, and salt bath temperature of 440°C., pyromellitic anhydride of 98 percent purity was obtained at a yield of 125 wt. %. The temperature of the catalyst layer reached 750°C. at the hot spot.

Example 3

Catalysts were prepared in the manner described in Example 1-A, except that the third promotor metal component was replaced by the metal component specified for each run in Table 1 below. Using those catalysts, durene was oxidized at vapor phase in the manner described in Example 1-B, except that the salt bath temperatures specified in Table 1 were employed. The results were also given in the same Table, in which * sign denotes that the specific run was conducted as a control.

TABLE I

| Run No. | Promotor Metal Components | Amount (atomic ratio in % to V + Cr) | Salt Bath Temp. in vapor-phase oxidation (°C.) | Product Pyromellitic Anhydride Yield (wt.%) | Purity (%) |
|---|---|---|---|---|---|
| 1 | — | — | 420 – 440 | 98.2 | 97.8 |
| 2 | $Sb_2O_3$ / $SnCl_4 \cdot 3.5H_2O$ | 1 / 4 | 390 – 420 | 121.2 | 98.5 |
| 3 | $Sb_2O_5$ / $SnCl_4 \cdot 3.5H_2O$ | 1 / 4 | 375 – 400 | 130.0 | 98.7 |
| 4 | $GeO_2$ | 2.7 | 410 – 430 | 135.6 | 98.0 |
| 5 | $InCl_3$ / $SnCl_4 \cdot 3.5H_2O$ | 1 / 4 | 390 – 420 | 126.1 | 98.5 |
| 6 | $NbCl_5$ | 1 | 370 – 410 | 105.0 | 98.3 |
| 7 | $TaCl_5$ | 1 | 370 – 410 | 103.3 | 98.3 |
| 8 | $Ga_2O_3$ | 2.5 | 410 – 430 | 102.5 | 98.0 |
| 9 | $ZrCl_4$ | 10.0 | 350 – 410 | 108.9 | 99.0 |
| 10* | NiO | 5.0 | 450 – 460 | 80.8 | 95.0 |
| 11* | $Ce_2O_3$ | 2.6 | 440 – 450 | 82.2 | 94.5 |
| 12* | $Ag_2O$ | 2.0 | 440 – 450 | 68.8 | 95.0 |

The results given in above Table 1 persuasively demonstrate that the promotor metal component within the scope of this invention is effective for improving the yield and purity of pyromellitic anhydride.

Example 4

A chromium sulfate solution containing 10.0 g of chromium component as $Cr_2O_3$ was added to a vanadyl sulfate solution containing 15.5 g of vanadium component as $V_2O_5$, and the resulting solution was further mixed with 2 g of stannic sulfate ($Sn(SO_4)_2 \cdot 2H_2O$) and 0.4 g of antimony trichloride. The V : Cr : Sn : Sb ratios in the solution as atomic ratios were approximately 1 : ¾ : 0.04 : 0.01 . The solution was poured onto 100 ml of crushed fused alumina (pure white) of a 2.4–3.4 mm diameter (6–8 mesh) grain size little by little, under heating. Upon completion of the pouring, the effective ingredients-bound alumina was precalcined at 400° – 450°C. to completely decompose and volatilize $SO_2$. The catalyst system was then calcined for 1.5 hours in an electric oven of 780°C., while passing sufficient air therethrough. 40 ml of the catalyst were packed in a Pyrex glass tube of 18 mm in inner diameter, and air was passed therethrough to be reacted with o-xylene which was fed at the concentration of 60 g/Nm$^3$ and space velocity of 5,000 l/hr. The salt bath temperature was 400°C. Thus pure white crude phthalic anhydride (99.3 % purity) was produced at a yield of 94.6 wt. %. The maleic anhydride yield in the run was 3.6 wt.%.

Example 5

250 Grams of ammonium metavandate and 180 g of ammonium chromate were dissolved in approximately 6 liters of hot water, and to the solution 250 g of 30 percent concentration silica sol solution (tradename: Snowtex 30), 50 g of stannic chloride ($SnCl_4 \cdot 3 \cdot 5H_2O$) and 10 g of antimony pentachloride were added with thorough stirring. The resulting suspension was poured onto 1 liter of silicon carbide carrier (tradename: Carbonrundum, 3 – 5 mesh in grain size), and together precalcined at 400° – 450°C. V : Cr : Sn : Sb in the system as atomic ratios were approximately 1 : 0.55 : 0.064 : 0.015. The pre-calcined catalyst was further calcined for 2 hours in an electric oven of 750°C., under sufficient air supply.

The above catalyst was packed in a 1-inch steel pipe (27 mm in inner diameter) over a length of 1,300 mm, and heated to 430°C. with the nitrate bath in the jacket. The reactor was continuously run for a month under the reaction conditions of o-xylene concentration of 75 g/Nm³ and space velocity of 5,000 l/hr, and crude phthalic anhydride of 98.7 percent purity was obtained at a yield of 95.0 wt. %. During the one month's continuous operation, no reduction in the catalytic activity was observed.

Example 6

20 g of ammonium metavanadate and 20 g of ammonium chromate were dissolved in 800 ml of hot water, and to which 0.45 g of germanium oxide ($GeO_2$) dissolved in 20 ml of 20 percent aqueous ammonia was added. The resulting transparent solution was added to 80 ml of a 2.4–3.4 mm diameter (6–10 mesh) silicon carbide (125 g) little by little and evaporated to dryness, adhering the residual carrier was calcined for 3 hours at 400°C. in the air with agitation, and further for 1.5 hours at 700°C. with agitation.

Forty(40) ml of the obtained catalyst ($V_2O_5 : Cr_2O_3 : GeO_2 = 1 : 0.75 : 0.051$) were used in the reaction using o-xylene at a concentration of 70 g/Nm³ supplied at a space velocity of 6,500 l/hr, under a salt bath temperature of 400°C. Thus phthalic anhydride of 99.3 percent purity was obtained at a yield of 87.7 wt. %.

Example 7

Catalysts were prepared in the manner described in Example 1-A, except that anitmony oxide and stannic chloride were replaced by germanium oxide, and that the amount of ammonium chromate was varied in each run to give different V : Cr ratios as specified in Table 2 below. The catalysts were used in oxidation reaction of o-xylene as described in Example 4, with the results as shown in Table 2.

TABLE 2

| Run No. | Atomic Ratio of V : Cr | Atomic Ratio in % of Ge to V + Cr | Optimum Reaction Temp. (°C.) | Phthalic Anhydride Yield (wt.%) | Purity (%) |
| --- | --- | --- | --- | --- | --- |
| 1 | 1 : 0.4 | 3 | 460 – 480 | — | — |
| 2 | 1 : 0.5 | 3 | 450 – 470 | 91.8 | 95.7 |
| 3 | 1 : 0.6 | 3 | 440 – 460 | 92.5 | 98.0 |
| 4 | 1 : 0.75 | 3 | 420 – 440 | 94.5 | 99.0 |
| 5 | 1 : 0.9 | 3 | 400 – 420 | 90.5 | 99.2 |
| 6 | 1 : 1.0 | 3 | 390 – 410 | 86.8 | 99.5 |

The o-xylene concentration in this Example was 65 g/Nm³ and space velocity was 4000 l/hr.

Example 8

A catalyst was prepared in the manner described in Example 1-A, except that the atomic ratio of V : Cr was changed to 1 : 0.75, and the percentile atomic ratios of Sn and Sb to V plus Cr were changed to, respectively, 14.3 percent and 2.9 percent. The catalyst was calcined at various temperatures as indicated in Table 3 below, and used in the oxidation of durene under the identical conditions with those of Example 1-B. The results were as given also in Table 3.

TABLE 3

| Run No. | Calcination Temp. (°C.) | Yield of Pyromellitic Anhydride (wt.%) |
| --- | --- | --- |
| 1 | 500 | 75.1 |
| 2 | 550 | 85.0 |
| 3 | 560 | 106.2 |
| 4 | 600 | 110.5 |
| 5 | 650 | 118.2 |
| 6 | 750 | 115.4 |
| 7 | 850 | 103.6 |

I claim:

1. A process for the preparation of an aromatic carboxylic anhydride comprising reacting o-xylene or durene with molecular oxygen in the vapor phase, in the presence of a solid oxidation catalyst, at a temperature of 320°C. to 850°C., said solid oxidation catalyst being obtained by by calcining, at a temperature not lower than 560°C., a mixture of
   a. vanadium oxide or a vanadium compound which is convertible to vanadium oxide at the calcining temperature,
   b. chromium oxide or a chromium compound which is convertible to chromium oxide at the calcining temperature, and
   c. at least one promoter selected from the group consisting of
      i. oxide of tin plus oxide of antimony,
      ii. oxide of germanium,
      iii. oxide of tin plus oxide of indium, and
      iv. at least one compound which is convertible to the said oxide (i), (ii) or (iii) at the calcining temperature,
   the atomic ratio of vanadium to chromium in the catalyst being 1:0.5 – 1:1.

2. The process of claim 1 wherein said promotor in the catalyst is present at a percentile atomic ratio based on the total of vanadium and chromium metals of 0.5 – 20 percent.

3. The process of claim 1 wherein said promotor comprises said oxide of tin and oxide of antimony.

4. The process of claim 1 wherein said promotor is said oxide of germanium.

5. The process of claim 1 wherein said catalyst is carried on a carrier having a specific surface area of not more than 2 m²/g.

6. The process of claim 1 wherein durene is supplied at a concentration of 10 – 60 g/Nm³.

7. The process of claim 1 wherein o-xylene is supplied at a concentration of 40 – 130 g/Nm³.

8. A process for the preparation of an aromatic carboxylic anhydride comprising reacting o-xylene or durene with molecular oxygen in the vapor phase at a temperature of 320°C. to 850°C. in the presence of a solid oxidation catalyst, said solid oxidation catalyst being prepared by the steps of dissolving or dispersing a mixture of
   a. vanadium oxide or a vanadium compound which is convertible to vanadium oxide at the calcining temperature,
   b. chromium oxide or a chromium compound which is convertible to chromium oxide at the calcining temperature, and c. at least one promoter selected from the group consisting of
  i. oxide of tin plus oxide of antimony,
  ii. oxide of germanium,
  iii. oxide of tin plus oxide of indium, and
  iv. at least one compound which is convertible to the said oxide (i), (ii) or (iii) at the calcining temperature,
in water or dilute acid aqueous solution together with silica sol, binding the solution or dispersion on a carrier having a specific surface area of not more than 2 m²/g, and thereafter calcining the system at temperatures not lower than 560°C., the atomic ratio of vanadium to chromium in the catalyst being within the range of 1:0.5 – 1:1, and the amount of promoter being within the range of 0.5 – 20 percent based on the total of vanadium and chromium in terms of percentile atomic ratio.

9. The process of claim 8 wherein said promotor comprises said oxide of tin and oxide of antimony.

10. The process of claim 8 wherein said promotor is said oxide of germanium.

* * * * *